(Model.)  2 Sheets—Sheet 2.
J ROE.
REEL FOR TAPE MEASURES, FISHING LINES, &c.
No. 387,541.  Patented Aug. 7, 1888.
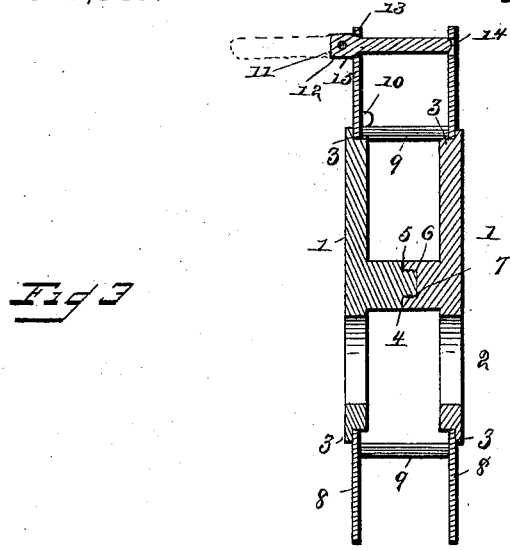
Fig 3.
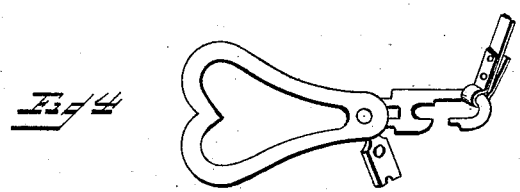
Fig 4.
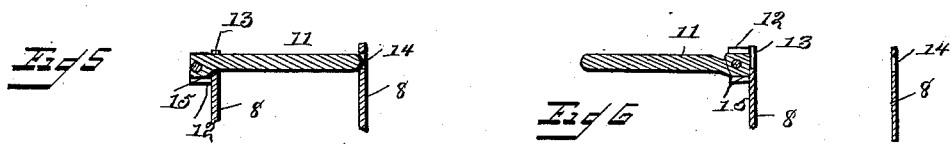
Fig 5.    Fig 6.
Fig 7.    Fig 8.
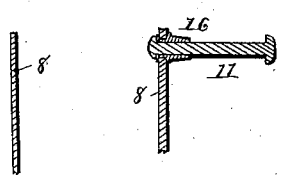
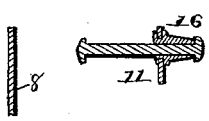
Witnesses,  Inventor,
Howell Battle  Justus Roe
Philip F. Larner  By Johnson & Johnson
  Attorneys.
N. PETERS, Photo-Lithographer, Washington, D. C.

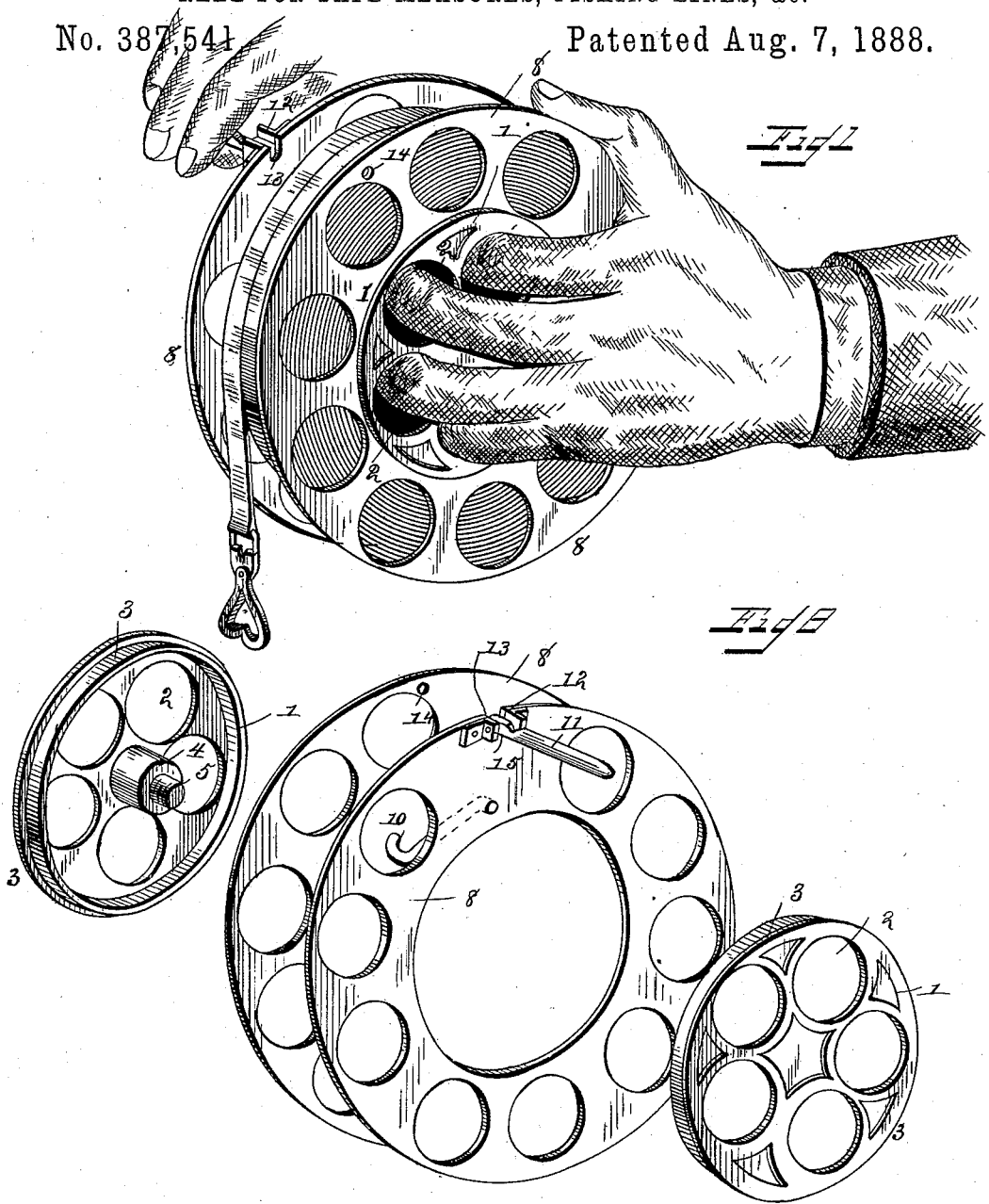

UNITED STATES PATENT OFFICE.

JUSTUS ROE, OF PATCHOGUE, NEW YORK.

REEL FOR TAPE-MEASURES, FISHING-LINES, &c.

SPECIFICATION forming part of Letters Patent No. 387,541, dated August 7, 1888.

Application filed March 14, 1888. Serial No. 267,178. (Model.)

*To all whom it may concern:*

Be it known that I, JUSTUS ROE, a citizen of the United States, residing at Patchogue, in the county of Suffolk and State of New York, have invented certain new and useful Improvements in Reels for Tape-Measures, Fishing-Lines, &c.; and I do hereby declare the following to be a full, clear, and exact description of the invention, such as will enable others skilled in the art to which it appertains to make and use the same.

I have improved the reel for winding surveyors' steel tapes, tape-measures of other materials, fishing-lines, cords for kite-flying, or any other similar tape or cord.

I provide a reel having open sides for permitting the tape or cord to dry thoroughly, and having a perforated central part for holding the reel by inserting the fingers of one hand through the perforations, and having the reel portion revolving upon the central part. I provide a reel having the central portion formed by two parts screwed together for convenient construction, and capable of being severed, so as to allow small articles to be placed in the space between the parts of the central portion, and I provide a reel having the reel portion open around its edge, and provided with a handle, which will serve for revolving the reel and for holding the tape or line in place when wound.

My invention consists in a reel having the separable central portion formed with perforations for the insertion of the fingers of one hand, and the reel portion revolving upon the same central portion and having the handle; and, furthermore, in the improved construction and combination or arrangement of parts of such a reel, as will hereinafter be more fully disclosed in the description, drawings, and claims.

In the accompanying drawings, forming part of this specification, and in which the same reference-numerals indicate the same or corresponding parts in all the figures, Figure 1 represents my improved reel in perspective as it is held and wound. Fig. 2 represents, in perspective, the reel and its central holding-sections separated. Fig. 3 is an axial section of the reel. Fig. 4 is the handle of the tape. Fig. 5 shows a detail of a pivoted winding-handle in position across the reel-plates to hold the tape-line in place. Fig. 6 shows a similar view with the handle in position to wind the reel, and Figs. 7 and 8 are similar views of a sliding handle device.

In the drawings, the numerals 1 1 indicate the two circular plates forming the central portion of the reel, and formed with perforations 2, preferably five, for the insertion of the fingers of one hand. The peripheries of the plates or disks are formed with flanges 3 at the outer sides, and a central stud, 4, projects from the inner side of one of the plates, and is formed with a reduced screw-threaded end, 5, which fits into a female screw-threaded bore, 6, in a stud, 7, projecting from the center of the other disk or plate, the threads of the end of the stud and of the bore of the other stud being so cut that the perforations in the disks or plates will preferably register when the studs are screwed tightly together.

Two annular perforated plates, 8, are placed upon the peripheries of the central disks, revolving upon the same and retained from slipping outward by the flanges 3, and these annular plates are spaced by pillars or rods 9, having their ends secured in the plates near the edges of the central apertures.

A hook, 10, formed by a piece of strong wire, having one end inserted into a perforation in one of the annular plates near the inner edge, and having its free end hooked, is secured with the straight portion bearing against the inner side of the plate, and a handle, 11, is pivoted between two outwardly-projecting lips, 12, secured at both sides of a notch or slot, 13, in the periphery of one annular plate, capable of being turned inward over the space between the peripheries of the two plates, engaging a perforation, 14, in the opposite plate and having its flat inner end, 15, bearing against the outer face of the plate at the inner end of the notch or slot and between the lips when turned outward, as shown in Figs. 5 and 6. I prefer, however, to use the sliding handle shown in Figs. 7 and 8 and confined by a guide-tube, 16, to the reel-plate, so as to be set inward over the line, as seen in Fig. 6, or pulled out for use as a handle.

In practice the reel is held by one hand, with the fingers inserted into the perforations of the central disks, and the handle is turned or pulled outward, when a tape or cord or line may be secured with the inner end to the hook and wound upon the reel by revolving the annular plates upon the central disks by means of the handle.

In winding a steel tape or similar tape, which is difficult to retain upon the reel, especially steel tape, on account of its springiness, the thumb is preferably held in contact with the tape during winding, as shown in Fig. 1 of the drawings, and when the entire tape or cord is wound upon the reel the free outer end may be retained by turning the pivoted handle over the same, the free end of the handle being held in the perforation in the plate, the plate yielding sufficiently in turning the handle and pressing the end of the same against its inner side to permit the end to enter the perforation and be held within the same. In using the sliding handle it is set inward for the same purpose.

The central disks form a receptacle, in which the handles of the tape, fish-hooks, or similar smaller articles may be placed, one of the disks being screwed off from the other and removed, being again replaced when the articles have been deposited.

When the reel is used for surveyors' steel tape and the tape is to be unwound in the field, the central disks may be removed and the reel revolved upon the hand, the thumb resting against the tape and confining it, preventing it from springing out by its elasticity.

By having the sides of the reel formed by the open or perforated annular plates the tape or cord may be thoroughly dried, if wet, without danger of rusting in the case of the steel tape or of rotting in the case of cord or textile tape.

By this construction a strong, simple, and comparatively inexpensive reel will be produced, and the reel may be made in all sizes and proportions, according to the uses to be made of the reel, the reel being preferably of a comparatively great diameter and short axis when used for tapes and similar use, while it is of a comparatively short diameter and long axis when it is to be used for fishing-lines. The center support and the reel proper, being open at the sides, permit the free passage for the air to circulate through and expose the interior of the reel, so as to prevent any serious amount of rust on the tapes.

I claim—

1. In a reel, the combination of the central part having two disks flanged and shouldered at their circumference and having hand-holds, with a circumferential part formed of two annular plates having spacing-rods, seated upon the shoulders and between the flanges of said disks, and forming the spool or reel adapted to be revolved upon said central flanged part, substantially as described.

2. In a reel, the combination of a circular central portion having perforations for the insertion of the fingers of one hand, and having flanges with annular plates revolving with their central apertures upon the central portion between the flanges, and having spacing posts or rods at the inner edges, substantially as described.

3. A reel consisting of a central part of separable disks flanged and shouldered at their circumference, and an annular circumferential reel part mounted upon the shoulders of the said disks between their flanges, the said central part having means for holding it in one hand, and the said circumferential part having means for revolving it between the said flanges, substantially as described.

4. In a reel, the combination, with a circular central separable portion having flanges and forming a receptacle, of an annular revolving reel portion upon the central portion between the flanges, substantially as described.

5. In a reel, the combination of two separable and equal-flanged circular disks having respectively a screw-threaded and a screw-bored stud at the center, with an annular reel portion fitted to revolve upon the disks between the circumferential flanges, as shown and described.

6. In a reel, the combination, with a central circular portion having end flanges, of two annular plates fitted to revolve upon the central portion between the flanges and having posts for spacing them near the inner edges, a hook secured to the inner side of one plate near the inner edge, and a handle mounted in the outer edge of one of said plates adapted to be set inward over the tape when wound, substantially as described.

7. In a reel, the combination of the circular disks having the flanges and the central studs, respectively, formed with a screw-threaded end and with a female-threaded bore and formed with the registering-apertures, the annular apertured plates having the spacing posts or rods, the hook having its bent end secured in one plate near the inner end, and the handle having a sliding adjustment over the tape, as shown, and for the purpose specified.

In testimony whereof I have affixed my signature in presence of two witnesses.

JUSTUS ROE.

Witnesses:
 GEO. F. HOWELL,
 F. A. OVERTON.